(12) United States Patent
Khan et al.

(10) Patent No.: US 11,486,816 B2
(45) Date of Patent: Nov. 1, 2022

(54) CORROSION MEASUREMENT DEVICE

(71) Applicant: BOURNEMOUTH UNIVERSITY HIGHER EDUCATION CORPORATION, Bournemouth (GB)

(72) Inventors: Zulfiqar Ahmad Khan, Bournemouth (GB); Hammad Nazir, Bournemouth (GB); Adil Saeed, Bournemouth (GB)

(73) Assignee: Bournemouth University Higher Education Corporation, Bournemouth (GB)

( * ) Notice: Subject to any disclaimer, the term of this patent is extended or adjusted under 35 U.S.C. 154(b) by 224 days.

(21) Appl. No.: 16/766,455

(22) PCT Filed: Nov. 21, 2018

(86) PCT No.: PCT/GB2018/053368
§ 371 (c)(1),
(2) Date: May 22, 2020

(87) PCT Pub. No.: WO2019/102193
PCT Pub. Date: May 31, 2019

(65) Prior Publication Data
US 2020/0378884 A1    Dec. 3, 2020

(30) Foreign Application Priority Data
Nov. 23, 2017   (GB) ..................... 1719481

(51) Int. Cl.
*G01N 17/02*        (2006.01)
*G01N 27/02*        (2006.01)
(Continued)

(52) U.S. Cl.
CPC ........... *G01N 17/02* (2013.01); *G01N 27/026* (2013.01); *G01N 27/041* (2013.01);
(Continued)

(58) Field of Classification Search
CPC ..... G01N 17/02; G01N 27/026; G01N 27/041
See application file for complete search history.

(56) References Cited

U.S. PATENT DOCUMENTS 8,111,078 B1 * 2/2012 Yang .................. G01N 17/02
                                              205/775.5
2004/0212370 A1 * 10/2004 Cunningham ....... G01N 27/026
                                              324/693
(Continued)

FOREIGN PATENT DOCUMENTS

CN      206479439      9/2017
EP      2 068 139      6/2009
(Continued)

OTHER PUBLICATIONS

Suzuki JPS60200153A machine translation (Year: 1985).*
(Continued)

*Primary Examiner* — Alvaro E Fortich
(74) *Attorney, Agent, or Firm* — Nixon & Vanderhye P.C.

(57) ABSTRACT

Apparatus (200) for detecting corrosion of a coating (250) of an object (216), the apparatus comprising: an electrically conductive body (202) defining a cavity (204) for containing an electrolyte (206), the body (202) arranged to be, in use, in electrically conductive contact with the object (216) and arranged to isolate, in use, the electrolyte (206) from the object; and a first electrode (208) within the cavity (204), the first electrode (208) for electrical connection to a potentiostat (402) or to a galvanostat and arranged to be, in use, in electrical contact with the electrolyte (206) in the cavity (204); wherein the body (202) comprises a first part (222) and a second part (224), the second part (224) being slidably movable relative to the first part (222) between a retracted position and an extended position.

15 Claims, 7 Drawing Sheets

(51) Int. Cl.
*G01N 27/24* (2006.01)
*G01N 27/416* (2006.01)
*G01N 27/04* (2006.01)
*G01N 27/22* (2006.01)

(52) U.S. Cl.
CPC ......... *G01N 27/221* (2013.01); *G01N 27/226* (2013.01); *G01N 27/24* (2013.01); *G01N 27/4163* (2013.01); *G01N 27/4166* (2013.01)

(56) References Cited

U.S. PATENT DOCUMENTS

| | | | | |
|---|---|---|---|---|
| 2009/0308144 | A1* | 12/2009 | Dorsch | G01N 17/02 205/333 |
| 2012/0055810 | A1* | 3/2012 | Zhou | G01N 17/02 205/775.5 |
| 2015/0308979 | A1* | 10/2015 | Adekunle | G01N 27/48 205/775.5 |

FOREIGN PATENT DOCUMENTS

| | | |
|---|---|---|
| JP | 60-200153 | 10/1985 |
| KR | 10-0763569 | 10/2007 |

OTHER PUBLICATIONS

International Search Report for PCT/GB2018/053368, dated Feb. 27, 2019, 3 pages.
Written Opinion of the ISA for PCT/GB2018/053368, dated Feb. 27, 2019, 8 pages.
Office Action for EP Application No. 18811620.6 dated Mar. 2, 2021, 4 pages.

* cited by examiner

CORROSION MEASUREMENT DEVICE

This application is the U.S. national phase of International Application No. PCT/GB2018/053368 filed 21 Nov. 2018, which designated the U.S. and claims priority to GB Patent Application No. 1719481.2 filed 23 Nov. 2017, the entire contents of each of which are hereby incorporated by reference.

FIELD

This invention relates to apparatuses and systems for use in sensing electrochemical change in an object. In embodiments, it relates to an electrochemical cell device. In other embodiments, it relates to systems including that device.

BACKGROUND

It is generally desirable to be able accurately to detect electrochemical change in certain objects. Detecting electrochemical change in an object can aid, for example, in determining maintenance requirements for the object. For example, if significant electrochemical change is detected in the object, it can be determined that a protective coating needs to be applied—or re-applied—to the object, or that part of the object needs to be replaced. If no significant electrochemical change is detected in the object, then it can be determined that no maintenance is required. Parts of structures as diverse as pipelines, cars, aircraft and oilrigs undergo testing for electrochemical change in order to determine maintenance requirements.

Errors in the detection of electrochemical change in an object can lead either to over-maintenance or to under-maintenance. For example, in the case of significant electrochemical change being erroneously detected, a protective coating may unnecessarily be applied or re-applied to an object, or a part of the object may be replaced, when the object has in fact not experienced significant electrochemical change. In the case of a measurement that fails to detect electrochemical change although in fact the object is undergoing such change, appropriate maintenance may not be carried out even though it is required.

One method of detecting electrochemical change in an object is through a Linear Polarisation Resistance (LPR) technique.

Another method of detecting electrochemical change in an object is by performing electrochemical impedance spectroscopy (EIS). In EIS, an alternating potential is applied to an electrochemical cell, and the response of the cell (its electrochemical impedance) is measured. The measured impedance—and in particular its frequency-dependence—can be analysed to determine if electrochemical change has occurred in an object. A particular example of the use of EIS will be described below in the "Detailed Description" section.

EIS can be performed on almost any object or system that can be modelled by an equivalent electrical circuit. For example, EIS can usefully be performed on an object consisting of a metal substrate with a protective coating. A standard setup for performing EIS on such an object consists of an electrochemical cell and a potentiostat or a galvanostat. The electrochemical cell is made up of an electrolyte, a reference electrode, a counter electrode and a working electrode. The object (consisting of the metal substrate and its coating) acts as the working electrode.

The reference electrode and counter electrode are placed in the electrolyte, which is generally a solution that closely resembles the actual application environment of the material being tested. The electrolyte, reference electrode and counter electrode are placed above the coated sample (working electrode). All the electrodes are connected to a potentiostat or to a galvanostat, or to an instrument that can function either as a potentiostat or a galvanostat. The potentiostat applies a potential between the reference electrode and working electrode and analyses the response of the system to determine the electrochemical state of the system and how this changes over time. The galvanostat controls the current flow between the working electrode and the counter electrode and measures the potential difference between the reference electrode and the working electrode.

There are two broad categories of apparatus for performing EIS: open electrochemical cells and sealed electrochemical cells. Each has the reference electrode, counter electrode and electrolyte described above (and, in use, the working electrode in the form of the object being tested). In an open electrochemical cell, the electrolyte is placed in direct contact with the object to be tested. An example of such an open electrochemical cell is shown in FIG. 1(a). As can be seen from this figure, the body of the cell provides walls to contain the electrolyte, but has no base. Instead, the base is provided by the object to be tested, such that the electrolyte is in contact with the object to be tested. By contrast, in a sealed electrochemical cell, the electrolyte is not placed in direct contact with the object to be tested; instead, a wall of the cell body separates the electrolyte from the object to be tested. Both open and sealed electrochemical cells—in known forms—have disadvantages.

Measurements using open electrochemical cells can result in damage to the object being tested due to direct contact between the electrolyte and the object. Such damage is illustrated schematically in FIG. 1(b), which shows a schematic view of a sample after testing with the open electrochemical cell shown in FIG. 1(a). Furthermore, open electrochemical cells can only reliably be used on substantially horizontal surfaces of an object. If an open electrochemical cell is fixed to a surface of an object that is at an angle, or indeed faces downwards, electrolyte will leak from the cell. If, as a result of electrolyte leakage, the volume of electrolyte changes during a measurement, the resulting measurement will be unreliable.

Measurements using a sealed electrochemical cell avoid the above disadvantages, but come with their own disadvantages. For example, in existing sealed electrochemical cells, it is difficult to achieve good electrical contact between the body of the cell and the object to be tested. If there is an air gap between the cell body and the object to be tested, either measurements cannot be taken at all, or they will be inaccurate.

To improve electrical contact between the cell body and the object, the cell body can be fixed to the object using an adhesive. This, however, can leave residual adhesive on an object after testing, which can promote undesired electrochemical change in the object. Further, since the material properties of the adhesive generally do not match those of the object being tested, this can introduce inaccuracies in measurements performed using such a cell. Although such inaccuracies can be removed mathematically, such removal is only approximate. Finally, since a cell including electrolyte can be relatively heavy, it cannot reliably be fixed to non-horizontal surfaces using an adhesive since there is a risk that it will fall.

Open and sealed electrochemical cells also share some disadvantages that are common to both types of cell.

First, to sense electrochemical change in an object that has been coated with a protective—non-conductive-coating, some of the coating must be removed so as to make electrical contact with the object and thereby form the working electrode. This exposes a (typically small) region of the object to the environment, and therefore exposes it to further electrochemical change such as corrosion.

Second, although existing electrochemical cells for measurement of electrochemical change in an object can be useful in laboratory applications, they may be impractical or even unsuitable for on-site field measurements, in particular in cases where the area to be analysed is large. Conventional cells can typically only analyse few centimetres of the object on which they are placed, due to the relatively small area that they cover. This means that such conventional cells are of limited use for analysis of a large area.

Although such sensors have a maximum theoretical range for sensing of approximately 0.5 m around the sensor, the accuracy of sensing decreases as the distance from the sensor increases. This can mean that a large number of sensors (or a large number of repeated measurements) are required for sensing over a large area. There will also be "dead zones" between sensed regions, since the regions sensed are approximately circular and therefore do not tessellate.

To increase the sensed area using a smaller sensor, a conductive gel can be spread onto a coating. This gel, although relatively inert, can nevertheless attract salt or other corrosive particles and can act to glue them to the surface, even after the gel is wiped off. This can increase electrochemical change in the object.

Using a larger sensor increases the area that can be tested, but larger sensors are not appropriate for all applications. When sensing of only a small area in a difficult-to-access location is required, a larger sensor may be inappropriate because it may not fit into the space available. Even when the location is accessible, if only a relatively small area is of interest, using a larger sensor can result in excessive processing times of measurements relative to a smaller sensor that could have been applied to the area of interest.

It is an object of at least certain embodiments to address one or more of these problems.

SUMMARY

First Aspect

According to a first aspect of the present disclosure, there is provided an apparatus for use in sensing electrochemical change in an object, the apparatus comprising: a substantially electrically conductive body defining a cavity for containing an electrolyte, the body arranged to be, in use, in electrically conductive contact with the object and arranged physically to isolate, in use, the electrolyte from the object; and at least a first electrode at least partially within the cavity, the first electrode for electrical connection to a potentiostat or to a galvanostat and arranged to be, in use, in electrical contact with the electrolyte in the cavity; wherein the body comprises at least one magnet arranged to, in use, apply a magnetic force to the object and thereby to attach the body to the object.

Effects

The at least one magnet arranged to, in use, apply a magnetic force to the object and thereby to attach the body to the object can make it easy to attach the cell to an object and to detach it from the object.

The at least one magnet also eliminates the need to use glue to attach the body to the object. Thus, glue residuals at the inspected surface are avoided. Further, the at least one magnet also allows for improved flow of electrical current between the at least a first electrode and the object, since glue can provide resistance to this flow of electrical current.

The at least one magnet allows the body to make good contact with an object, without a significant air gap between the body and the object. This provides for electrical current to flow to and from the at least the first electrode through the cell body and the object, without encountering significant resistance due to the presence of an air gap in this circuit.

The body, in being arranged physically to isolate, in use, the electrolyte from the object allows for the apparatus to be used in sensing the electrochemical state of an object without the electrolyte coming into contact with the object. This eliminates the risk of damage to the object being tested due to direct contact between the electrolyte and the object.

Definitions

In being for use in sensing electrochemical change in an object, the apparatus may be for use in performing electrochemical impedance spectroscopy on an object. In being for use in sensing electrochemical change in an object, the apparatus may be for use in performing a linear polarisation resistance method on an object. The expression "in use" may mean "when the apparatus is used to sense electrochemical change in an object". The expression "in use" may therefore mean "when the apparatus is used to perform electrochemical impedance spectroscopy on an object" or "when the apparatus is used to perform a linear polarisation resistance method on an object." In being arranged physically to isolate the electrolyte from the object, the substantially electrically conductive body is arranged to prevent the electrolyte from contacting the object. In being arranged to be, in use, in electrically conductive contact with the object, the body may be arranged to be in direct physical contact with the object. In being arranged to be, in use, in electrically conductive contact with the object, the body may be arranged to be in electrically conductive contact with the object via a substantially electrically conductive intermediary, for example a substantially electrically conductive overlay as detailed below.

In being substantially electrically conductive, the substantially electrically conductive body is sufficiently conductive to conduct electricity between the first electrode and the object. In other words, the substantially electrically conductive body is electrically conductive. Substantially all of the body may be substantially electrically conductive. This means that the body can be applied in a number of orientations to the object and still be in electrically conductive contact with the object. It also means that the body can be manufactured from a single material. This may be more cost-effective than using more than one material. Alternatively, only part of the body may be substantially electrically conductive. This means that a part of the body that needs to be in electrically conductive contact with the object in order for sensing to be performed using the apparatus can be formed of an electrically conductive material, and the rest of the body can be formed from another material. This can reduce the cost of the apparatus where the electrically conductive material is significantly more expensive than the other material used.

Electrodes

The first electrode may be a counter electrode. In other words, the first electrode may be arranged to, in use, deliver current to the electrolyte. The counter electrode may be in the form of a mesh. The counter electrode may be of a substantially electrochemically inert material. The counter electrode may be of platinum or of aluminium.

The apparatus may further comprise a second electrode. The second electrode may be a reference electrode. In other words, the second electrode may be arranged to be used to measure the potential of another electrode. The reference electrode may be a hydrogen electrode, a saturated calomel electrode, a copper-copper (II) sulphate electrode, a silver-chloride electrode, or a palladium-hydrogen electrode.

The first electrode may be a working electrode.

Body

The body may be of aluminium. The body may be of platinum. When the body is of aluminium, the body has fairly high electrical conductivity and is fairly electrochemically inert, while also being formed of a material that is relatively inexpensive. When the body is formed of platinum, the body has high electrical conductivity and is electrochemically non-reactive. This means that the body is able to conduct electricity through the apparatus to and/or from the object to be tested, without itself experiencing electrochemical change. Electrochemical change of the body can affect measurements of electrochemical change in an object, because the measurement will pick up electrochemical change of the cell body.

The body may have a first surface arranged to be, in use, in electrically conductive contact with the object along substantially the whole of a length of the first surface and may comprise at least a first part and a second part, the second part slideably movable relative to the first part from a first, retracted, position to a second, extended, position, such that the length of the first surface is greater when the second part is in the second position than when the second part is in the first position.

When the body is arranged as just described, it is able to "telescope". This is discussed further below, in relation to the third aspect.

Magnet

The at least one magnet arranged to, in use, apply a magnetic force to the object and thereby to attach the body to the object may be a permanent magnet. The at least one magnet may be samarium cobalt. Samarium cobalt magnets are light weight, small in size, powerful, have a strong resistance to corrosion and can be used in high temperature and poor working conditions.

The at least one magnet may be the substantially electrically conductive body. That is, the electrically conductive body may be a permanent magnet.

The apparatus may further comprise an electrolyte contained by the cavity; a potentiostat or a galvanostat electrically connected to the first electrode; and an electrical connector arranged to be electrically connected to the object. This arrangement provides a complete apparatus that can be used without further modification or additions to sense electrochemical change in an object, by simply applying the body to the object and connecting the electrical connector to the object.

Second Aspect

According to a second aspect of the present disclosure, there is provided a system for use in sensing electrochemical change in an object, the system comprising: a first apparatus according to the first aspect, wherein the at least a first electrode comprises a counter electrode; and a second apparatus according to the first aspect, wherein the at least a first electrode comprises a working electrode.

Effects

By providing a second apparatus according to the first aspect, the object in which electrochemical change is to be sensed can be made into a working electrode without the need to connect an electrical connector directly to the object. Thus, in applications in which the object has a protective coating, there is no need to remove a patch of this coating in order to test an object under a non-conductive coating.

Third Aspect

According to a third aspect of the present disclosure, there is provided an apparatus for use in sensing electrochemical change in an object, the apparatus comprising: a substantially electrically conductive body defining a cavity for containing an electrolyte, the body having a first surface arranged to be, in use, in electrically conductive contact with the object along substantially the whole of a length of the first surface and arranged physically to isolate, in use, the electrolyte from the object; and at least a first electrode at least partially within the cavity, the first electrode for connection to a potentiostat or a galvanostat and arranged to be, in use, in electrical contact with the electrolyte in the cavity; wherein the electrically conductive body comprises at least a first part and a second part, the second part slideably movable relative to the first part from a first, retracted, position to a second, extended, position, such that the length of the first surface is greater when the second part is in the second position than when the second part is in the first position.

Effects

Since the substantially electrically conductive body comprises at least a first part and a second part, the second part slideably movable relative to the first part from a first, retracted, position to a second, extended, position, such that the length of the first surface is greater when the second part is in the second position than when the second part is in the first position, the body can "telescope". That is, the body can be extended by sliding the first part or the second part or both parts relative to one another so that the second part is in the second, extended position. This increases (relative to when the second part is in the first position) the length of the first surface that is arranged to be, in use, in electrically conductive contact with the object. In turn, this increases the surface area of the body that is in electrically conductive contact with the object. This means that the apparatus can be made to be relatively portable and suitable for sensing electrochemical change in relatively small objects, or objects in difficult-to-access areas when the second part is in the first position, while allowing for larger surfaces to be analysed when the second part is in the second position. This makes the apparatus more versatile than an apparatus that has one fixed size. There may therefore be no need, for example, to use a conductive gel to increase the surface area that can be analysed with the apparatus. Instead, it can simply be extended.

Sealing

The body may be arranged to retain electrolyte at substantially any orientation of the body. The first and second parts may be substantially tubular and may be arranged such that at least a first portion of one of the parts is radially within the other part when the second part is in the first position. The first and second parts may be arranged such that when the second part is in the first position, a greater portion of one of the parts is radially within the other part than when the second part is in the second position. Each of the first and second parts may comprise an end that is distal from the other part and that is closed. For example, the distal ends may be arranged so as not to allow a liquid to pass through them.

In being arranged to retain electrolyte at substantially any orientation, this configuration allows for the body to be attached to a surface at substantially any orientation, without electrolyte escaping from the body. As discussed above, if electrolyte escapes during measurement, the measurement results are adversely affected. This sealed design may be in synergy with the use of magnets in the apparatus, since together these features allow for the apparatus be attached at any orientation—even up-side-down—such that it can be attached, for example, to ceilings and structures with challenging geometrical configuration.

Electrically Conductive Overlay

The apparatus may further comprise a substantially electrically conductive overlay on at least a portion of the first surface, the substantially electrically conductive overlay arranged to conduct, in use, electricity between the first surface and the object. When the second part has at least a first portion that is radially within the first part when the second part is in the first position, the overlay may be arranged on a second portion of the second part that is not radially within the first part when the second part is in the first position. The overlay may be arranged to move from a first state when the second part is in the first position to a second state when the second part is in the second position, wherein the second state is extended relative to the first state.

In this way, the overlay extends and contracts with corresponding movement of the second part, and thereby allows electrically conductive contact between the second part and the object to be tested to be maintained, regardless of the position of the first part. Without the overlay, when the first and second parts are substantially tubular and the second part has a first portion that is radially within the first part when the second part is in the first position and a second portion of the second part that is not radially within the first part when the second part is in the first position, if the body is applied to a flat surface, the second portion will not be in electrically conductive contact with the surface. This can allow the whole of the body to be in electrically conductive contact with an object to be tested, or at least increases the contact area relative to an arrangement in which the overlay is not present.

The overlay may be a mesh that is arranged to be extended and/or compressed. The overlay may be a folded material that is arranged to be extended and/or compressed. The overlay may be a coil that is arranged to be extended and/or compressed. Each of these arrangements allow the overlay to move from a first state when the second part is in the first position to a second state when the second part is in the second position, wherein the second state is extended relative to the first state.

The substantially electrically conductive overlay may have an electrical conductivity that is at least equal to the electrical conductivity of the substantially electrically conductive body.

The substantially electrically conductive overlay may extend radially around the second part. This allows the apparatus to be used in any radial orientation, while maintaining electrical contact between the second part and the object to which the body is applied.

Pipes

The body may comprise first and second pipes in fluid communication with the cavity. The first pipe may be arranged to be used to introduce electrolyte into the cavity. The second pipe may be arranged to allow air to escape from the cavity. The first pipe may extend further into the cavity than the second pipe. This allows the body to be completely filled with electrolyte, and thus prevents air pockets within the cavity, which would adversely affect measurements using the apparatus.

Magnet

The body may comprise at least one magnet arranged to, in use, apply a magnetic force to the object and thereby to attach the body to the object. As discussed above in relation to the first aspect, this allows the body to be attached to an object without the use of glue. When the second part has at least a first portion that is radially within the first part when the second part is in the first position, the at least one magnet may be arranged on a radially-inner surface of the second part.

Optional features of each aspect are also optional features of each other aspect, with changes of terminology being inferred by the skilled addressee where necessary for these to make sense.

BRIEF DESCRIPTION OF THE DRAWINGS

Specific embodiments will be described below by way of example only and with reference to the accompanying drawings, in which:

FIG. 1(*b*) shows part of an object after EIS has been performed on it using the open electrochemical cell;

DETAILED DESCRIPTION

Figure 1A:
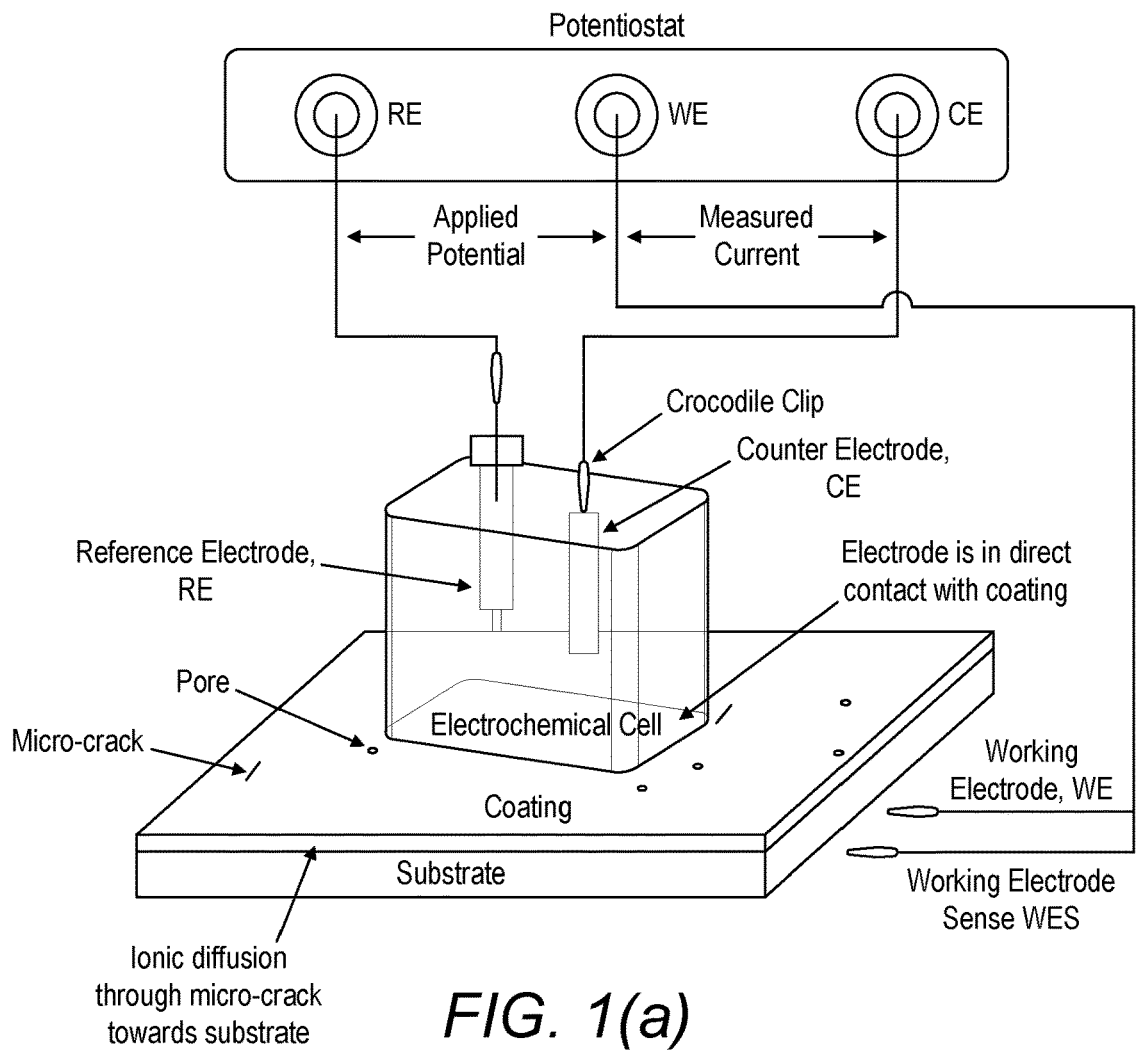
FIG. 1(*a*) shows a schematic view of an open electrochemical cell.
Figure 1B:
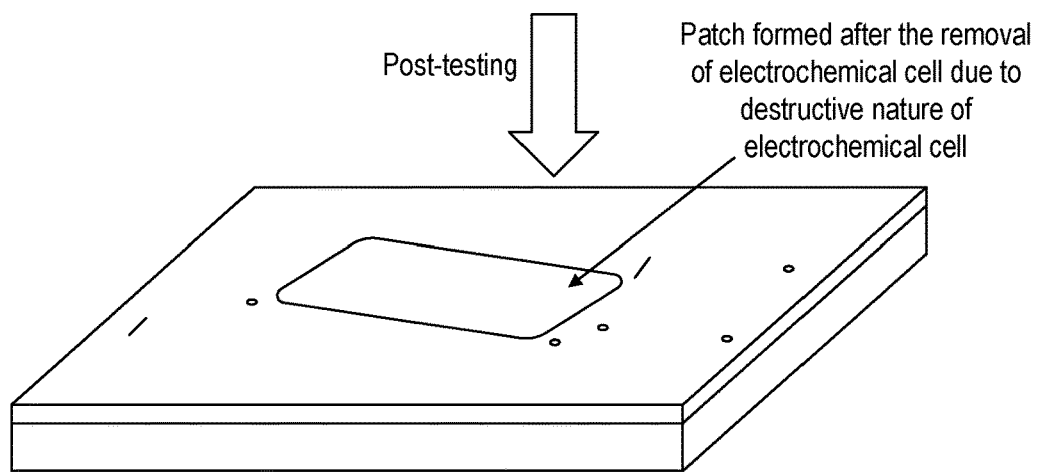
Figure 2:
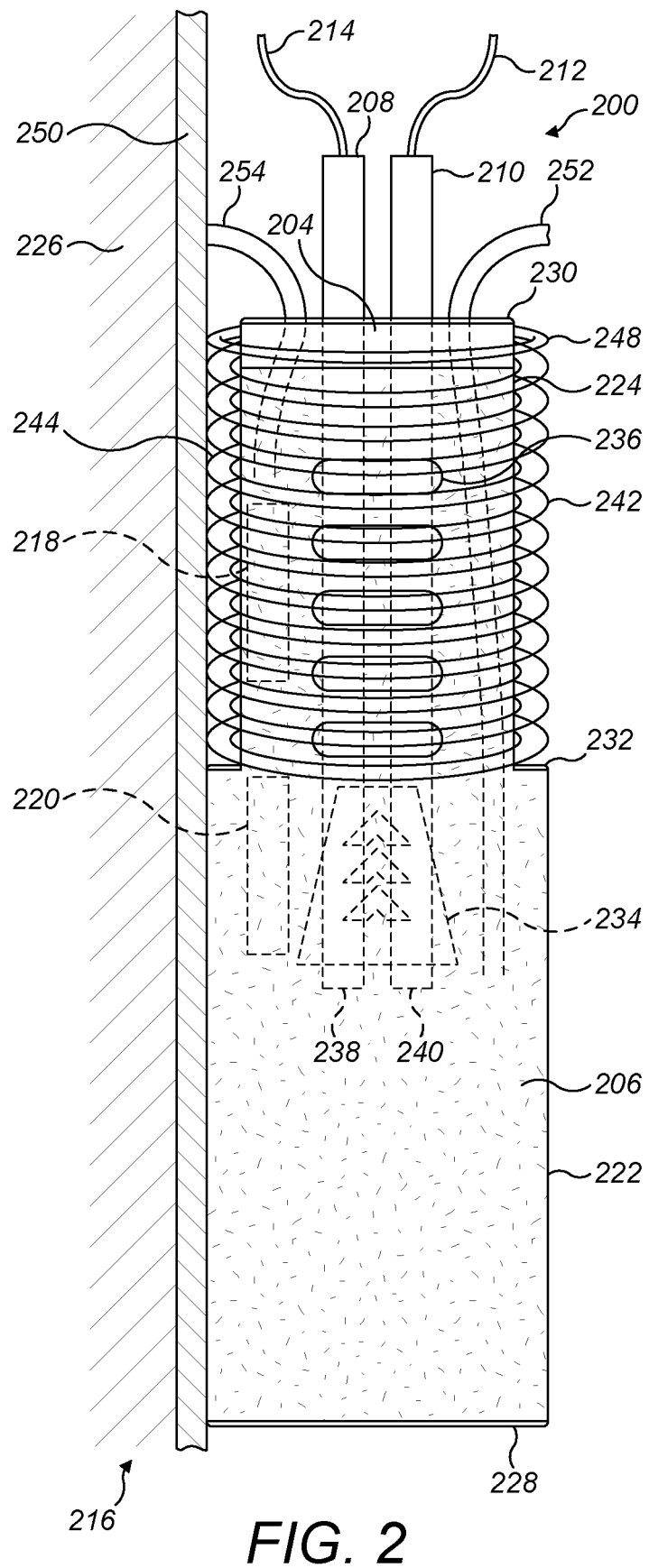
FIG. 2 shows a first example of an apparatus for use in sensing electrochemical change in an object, the apparatus in the form of a two-electrode electrochemical cell device and shown in its extended state.
Figure 3:
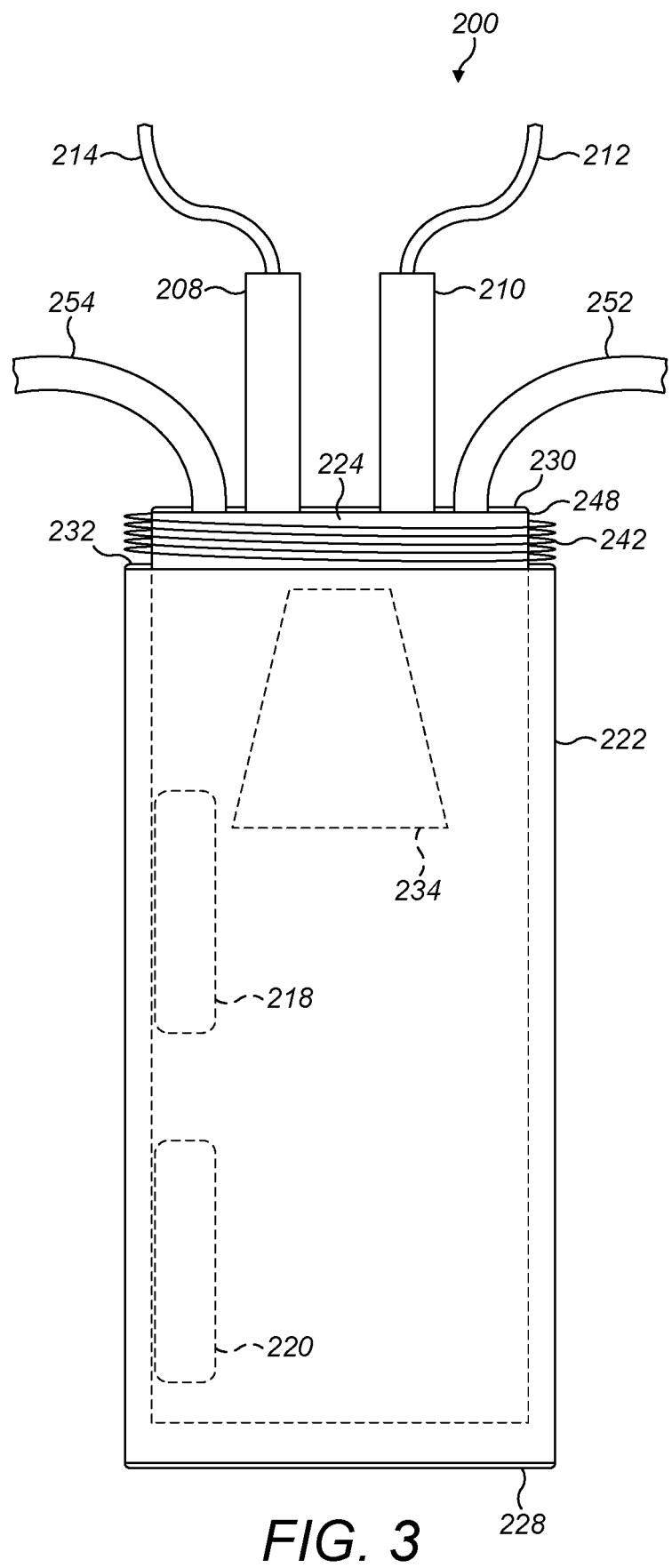
FIG. 3 shows the two-electrode electrochemical cell device in its retracted state.

With reference to FIG. 2, an example of an apparatus for use in sensing electrochemical change in an object will now be described. In this example, the apparatus is a two-electrode electrochemical cell device 200. The electrochemical cell device 200 has a substantially electrically conductive body in the form of a cell device housing 202. The cell device housing 202 defines a cavity 204 which, in use, is filled with electrolyte 206. The electrochemical cell device 200 also has a first electrode in the form of a counter electrode 208. In this example, the electrochemical cell device 200 also has a second electrode in the form of a reference electrode 210. The electrodes are within the cavity 204 and are connected to cables 212 and 214 so as to be electrically connected to a potentiostat or to a galvanostat when the electrochemical cell device 200 is being used to sense electrochemical change in an object 216. In this example, the cell device housing 202 contains two magnets 218 and 220 that allow the electrochemical cell device 200 to be attached to the object 216. In this example, the cell device housing 202 is made up of a first part and a second part in the form of outer and inner tubes 222, 224. The inner tube 224 is slideably moveable relative to the outer tube 222 so as to extend or retract the cell device housing 202, thereby increasing or decreasing the length of the housing 202. FIG. 2 shows the two-electrode electrochemical cell device 200 in its extended state, with the inner tube 224 extended. FIG. 3 shows the two-electrode electrochemical cell device 200 in its retracted state, with the inner tube 224 retracted.

The two-electrode electrochemical cell device 200 will now be described in more detail with reference to FIG. 2. FIG. 2 shows a schematic cross-section of the of electrochemical cell device 200 for measuring the corrosion rate of a coated substrate 226. The cell device housing 202 is made up of an inner tube 224 positioned inside an outer tube 222 in a telescopic fashion. The cell 200 can be built from any conductive material which has high conductivity, however, the conductivity of the cell material and the subject material should as close as possible, if not calibration could be used. In this example, the inner and outer tubes 224, 222 are made of aluminium. In another example, they are made of platinum. Both the tubes are sealed at the bottom 228, top 230 and in-between 232. The length of the electrochemical cell device 200 can be adjusted by a button 234 which upon release fits and locks itself on any groove 236 it encounters on the inner tube 224, The telescopic extension of the electrochemical cell device 200 allows for measurements to be performed on a larger area of the substrate 226 when the electrochemical cell device 200 is extended than when it is in its retracted state. The electrochemical cell device housing 202 defines a cavity 204. This cavity 204, when the electrochemical cell device 200 is in use, contains an electrolyte 206.

The cavity 204 also has a counter 208 and reference 210 electrodes in it, with a respective counter electrode cell device cable 214 and reference electrode cell device cable 212 extending out of the cavity 204. The counter electrode 208 in this example is in the form of a metal mesh 238. In this example, the counter electrode 208 is made from platinum. The mesh 238 in this example has a surface of approximately 40 cm². The reference electrode 210 in this example is a saturated calomel electrode, which is very stable. It has a glass body 240. The reference electrode 210 is placed in the centre of the cavity 204.

In other examples, the counter electrode 208 can be made from another electrochemically inert metal, such as aluminium. The reference electrode 210 can be for example a standard hydrogen electrode, a saturated calomel electrode, a copper-copper (II) sulphate electrode, a silver-chloride electrode, or a palladium-hydrogen electrode. In certain measurement cases, such as for following higher frequencies, such as frequencies of 105 Hz or more, the reference electrode 210 is coupled via a capacitor to an inert metal wire (such as a platinum wire), which can for instance be mounted beside the reference electrode 210. The inert metal wire then follows the higher frequencies and a "dual reference electrode" is obtained. This is particularly suitable when the reference electrode 210 is a saturated calomel electrode.

By using separate counter 208 and reference 210 electrodes, the two-electrode electrochemical cell device 200 of FIG. 2 is arranged such that in use the reference electrode 210 does not deliver a current. Thus, the measured impedance contains no contribution from possible polarisation effects of the reference electrode 210. In addition, by using a very stable reference electrode 210 such as the saturated calomel electrode used in this example, the set point voltage and the current can be set very accurately. This is particularly advantageous for strongly degraded coatings, for which the potential is relatively unstable.

The inner tube 224 is capped with an extension coil 242 that in this example is made from aluminium. In other examples, the extension coil 242 can be made from another electrochemically inert material, such as platinum. The extension coil 242 provides electrical contact 244 between the inner tube 224 and the substrate 226. A coil stopper 248 on one end of the inner tube 224 keeps the extension coil 242 in place on the inner tube 224 by preventing it from sliding off the inner tube 2. The extension coil 242 is compressed when the electrochemical cell device 200 is contracted and is extended when the electrochemical cell device 200 is extended. The complete body of the electrochemical cell device 200 including the coil 242 acts as a counter electrode and comes into contact with the substrate 226 when the electrochemical cell device 200 is attached to the substrate 226. In other examples, the coil 242 can be replaced with other overlays that can be extended and compressed with movement of the inner tube 224. For example, a folded wire, plate or tube can be used, since each of these arrangements can extend or compress. Similarly, a mesh (whether regular or irregular, including, for example, a bundle of wires such as wire wool) can be used for the same reasons. In the above example, the extension coil 242 extends around the inner tube 224. It will be understood by the skilled person, however, that in other examples the overlay need only be applied to whichever part of the tube is required to be in electrically conductive contact with the substrate 226.

The housing 202 of electrochemical cell device 200 has an inlet pipe 252 and an outlet pipe 254. As can be seen from FIG. 2, the inlet pipe 252 extends further into the cavity 204 defined by the housing 202 than the outlet pipe 254. This allows the cavity 204 defined by the housing 202 to be filled with electrolyte 206 via the inlet pipe 252, with air escaping through the outlet pipe 254. The relative positions of the inlet 252 and outlet 254 pipes allow the housing 202 to be completely filled with electrolyte 206.

The electrochemical cell device 200 further comprises magnets 218, 220 on the inner tube 224 for attaching the electrochemical cell device 200 to the substrate 226.

The magnetic flux density of the magnets 218, 220 depends on the length to which the cell device 200 has been extended and the type of application. The further the device 200 is extended, the more electrolyte 206 will be required to fill the device 200. Accordingly the filled device 200 will be heavier. Generally, magnetic flux density is selected such that the force required for pulling off the electrochemical cell device 200 is at least 10 N. By selecting a magnet with such a relatively high magnetic flux density, gaps between the cell device housing 202 and the object 216 can be avoided. This eliminates the extra resistance from these gaps, increasing reliability of measurements relative to measurements made with such gaps. On the other hand, the magnetic flux density is also selected such that the pull-off force required does not exceed 25 N, so that the electrochemical cell device 200 can relatively easily be removed from a substrate 226 when this is required. In this example, the magnets 218, 220 are permanent samarium cobalt magnets (ferromagnets). These magnets are light weight, small in size, powerful, have a strong resistance to corrosion and can be widely used in high temperature and poor working conditions. In other examples, other permanent magnets meeting these conditions can be used.

The thickness of the electrochemical cell device 200 tubes 222, 224 is selected to be thin enough that the electrochemical cell device 200 is relatively light-weight and easy to attach to a substrate 226. In this example, the thickness of the tubes 222, 224 is 0.5 mm. In other examples, the thickness of the tubes 222, 224 is between 0.1 mm and 1 mm. In this example, the inner tube 224 is 35 mm wide and the outer tube 222 is 40 mm wide. The lengths of the inner and outer tubes 224, 222 are such that in this example, the electrochemical cell device 200 can extend up to one metre in length.

The inner telescopic tube 224 has an electrically conductive overlay. In this example, the overlay is in the form of an extension coil 242 wrapped around the inner tube 224. The extension coil 242 in this example is made of aluminium. The radially-outer edges of the extension coil 242 are at the same radial distance from the axis of the electrochemical cell device 200. Thus, when the electrochemical cell device 200 is placed on a surface with the axis of the electrochemical cell device 200 substantially parallel to the surface, both the outer tube 222 and the extension coil 242 are in contact with the surface along substantially the whole of their combined length.

The extension coil 242 squeezes upon contraction of the electrochemical cell device 200 (as shown in FIG. 3) and opens upon extension (as shown in FIG. 2). In both the extended and retracted states of the inner tube 224, the extension coil 242 is in electrical contact with the inner tube 242, along the length of the coil 242. The coil 242 allows the whole body of the electrochemical cell device 200 to be in electrically conductive contact with the substrate 226 when the electrochemical cell device 200 is attached to the substrate 226, The extension coil 242 is bounded at its end furthest from the outer tube 222 by a radial projection that prevents the coil 242 from slipping off the inner tube 224. The extension coil 242 is bounded at its other end by the outer tube 222.

The electrochemical cell device 200 has seals at each of its two ends 230, 234, that is, at one end of the inner tube 224 and at the end of the outer tube 222 that is furthest from the inner tube 224. In this example, the seals are in the form of rubber stoppers 248 that plug the end of the tubes. In other examples, the seals can be implemented in other ways, for example by being integrally formed with, respectively, the inner and outer tubes 224, 222. A further seal between the outer and inner tubes 222, 224 is arranged to prevent leaks of electrolyte 206 during extension and contraction of the electrochemical cell device 200. In this example the seal between the inner and outer tubes 224, 222 is in the form of a rubber O-ring.

Figure 7:
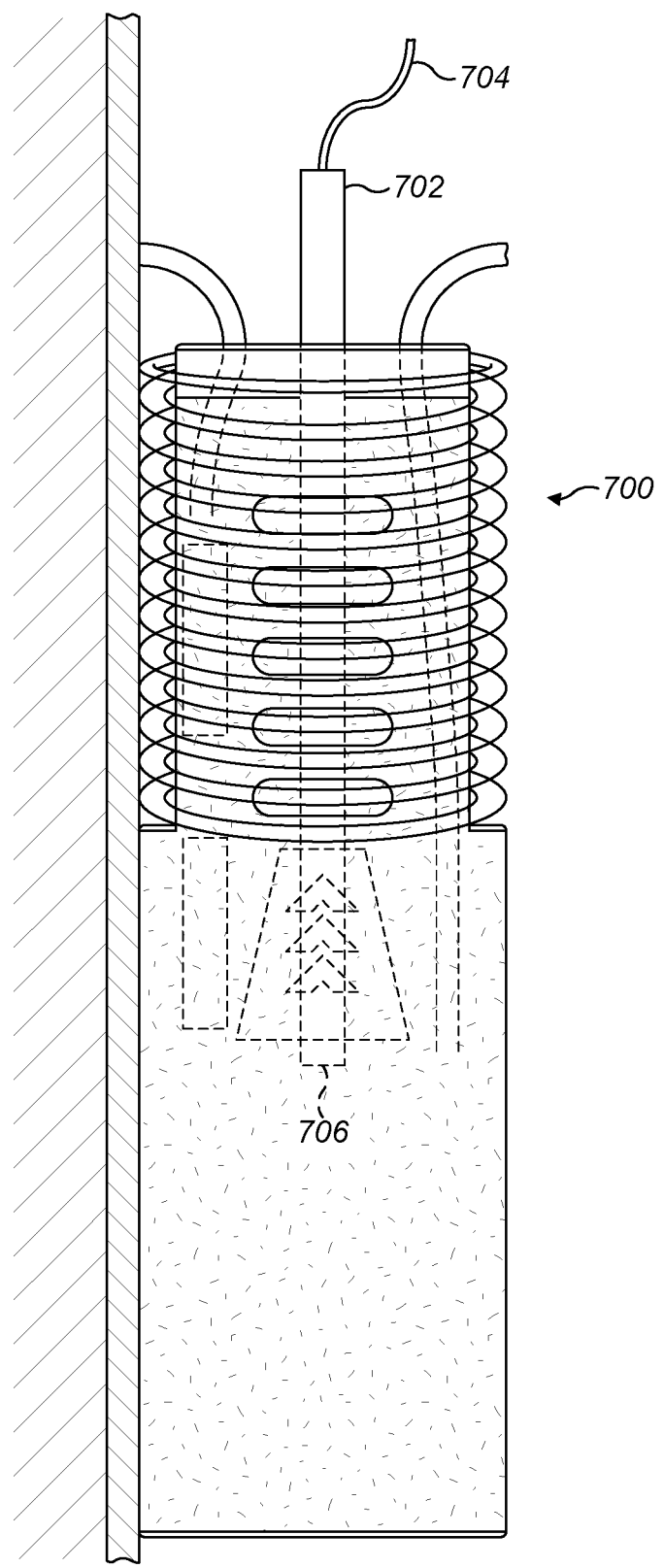
FIG. 7 shows a single-electrode electrochemical cell device with a combined counter and reference electrode.

With reference now to FIG. 7, an example of an alternative apparatus for use in sensing electrochemical change in an object will now be described. In this example, the apparatus is a single-electrode electrochemical cell device 700. Instead of having separate reference and counter electrodes as in the two-electrode electrochemical cell device 200 shown in FIG. 2, the single-electrode electrochemical cell device 700 of FIG. 7 has just one electrode 702. This electrode 702 can act as a combined counter and reference electrode. When this combined counter electrode and reference electrode is immersed in the electrolyte 206, the electrode 702 can be used both for delivering the current and as a reference electrode.

The above-described electrochemical cell device 700 comprises magnets 218, 220 and is also arranged to be telescoped (i.e. comprises an inner and an outer part 224, 222 that are moveable relative to one another). It will be understood by the skilled person, however, that devices in which only one of these features is present also fall within the scope of this disclosure. In other words, a telescoping device need not have magnets, and may instead be fixed to an object by other means (for example with glue), and a device with magnets need not telescope, and may instead be formed in a single part.

Figure 4:
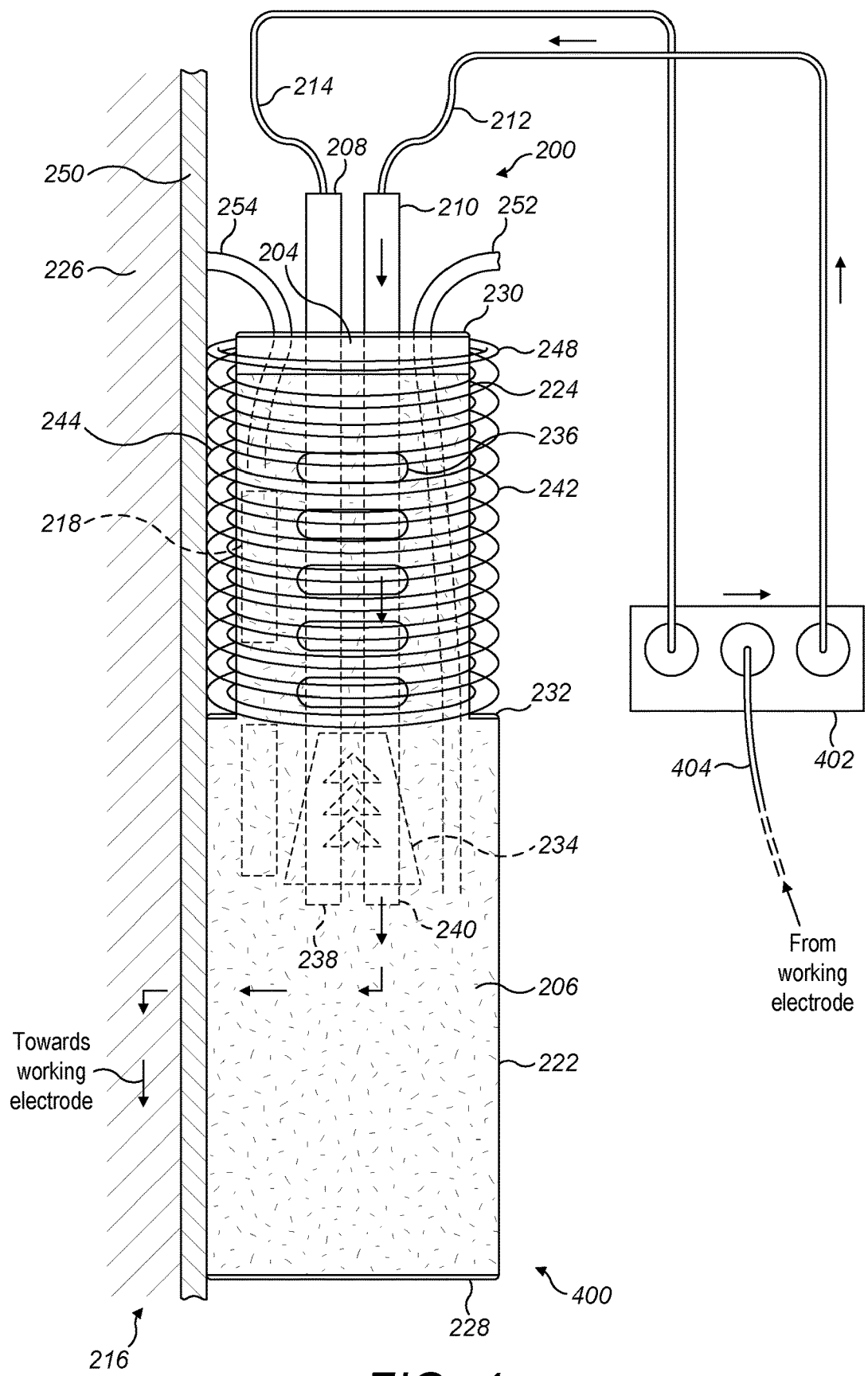
FIG. 4 shows the two-electrode electrochemical cell device in use in its extended state, connected to a galvanostat.

With reference now to FIG. 4, a setup for sensing electrochemical change in an object will now be described. In this example, the setup is for measuring the condition of coated metal substrate 226. The setup is made up of the electrochemical cell device 200 described above with reference to FIG. 2, and additionally an electrolyte 206, a potentiostat 402 and an electrical connector in the form of a working electrode cable 404. In other examples, a single-electrode electrochemical cell device 700 as described above with reference to FIG. 7 can be used in place of the two-electrode electrochemical cell device 200 of FIG. 2.

The single electrochemical cell setup can be used to perform EIS. EIS is particularly used for analysing the condition of coatings that have been applied on conductive substrates such as conductive metals. For example, EIS can be used to analyse non-conductive polymeric coatings that are used to protect the conductive substrate from, for example, corrosion.

The single electrochemical cell setup is set up to be used to measure the corrosion rate of the substrate 226. In this example, the substrate 226 has a coating 250 applied to it. To put together the single electrochemical cell setup, the electrochemical cell device chamber 204 is filled with an electrolyte 206 via the inlet pipe 252. Air escapes through the outlet pipe 254. Any appropriate electrolyte can be used to fill electrochemical cell device chamber 204. It is useful to use electrolyte which approximates to the environment to which the substrate 226 is normally exposed. Liquid aqueous solution such as an aqueous NaCl, an aqueous KCl and an aqueous $Na_2SO_4$ can all be used. The salt concentration of the electrolytes in different example systems can vary widely. Concentrations in the range of 0.001 to 1 M are particularly suitable. In this example, the NaCl concentration is around 0.17 M.

Either before or after the electrochemical cell device 200 is filled with electrolyte, the reference and counter electrodes 210, 208 are connected to corresponding terminals on the potentiostat 402, via reference electrode and counter electrode cables 212, 214. A working electrode cable 404 is connected to the working electrode terminal on the potentiostat 402, ready to be connected to the substrate 226 to be tested to transform the object 216 into a working electrode.

The magnets within the electrochemical cell device 200 enable it to be attached to the substrate 226 to be analysed. As shown in FIG. 2, in use, the electrolyte 206 does not come into direct physical or electrical contact with the substrate 226. Instead, electrical current follows a path from the counter electrode 208, through the electrolyte 206, through the cell body to the substrate 226.

During non-destructive measurement, the electrochemical cell device 200 is in direct electrical contact with the substrate 226 such that the current flows from the counter electrode 208 to the electrolyte 206 and enters the substrate 226 via the cell body of the electrochemical cell device 200. As described above, in a conventional open electrochemical cell, by contrast, the electrolyte comes into direct contact with the substrate. This results in a chemical reaction with the substrate, damaging or—at worst—ultimately destroying, the substrate.

The single electrochemical cell setup 400 can also be used for the non-destructive corrosion measurements of metal coatings, bare metals and alloys through a Linear Polarisation Resistance (LPR) method.

Two electrochemical cell devices 200 can be used to perform non-destructive testing of a coating without the need to remove a patch of coating to reach to the substrate for attaching the working electrode cable. Such a system will now be described with reference to FIG. 6, which shows a two electrochemical device setup 600. In the two electrochemical cell device setup, one cell device 602 acts as a counter electrode while the other 604 acts as a working electrode.

Figure 5:
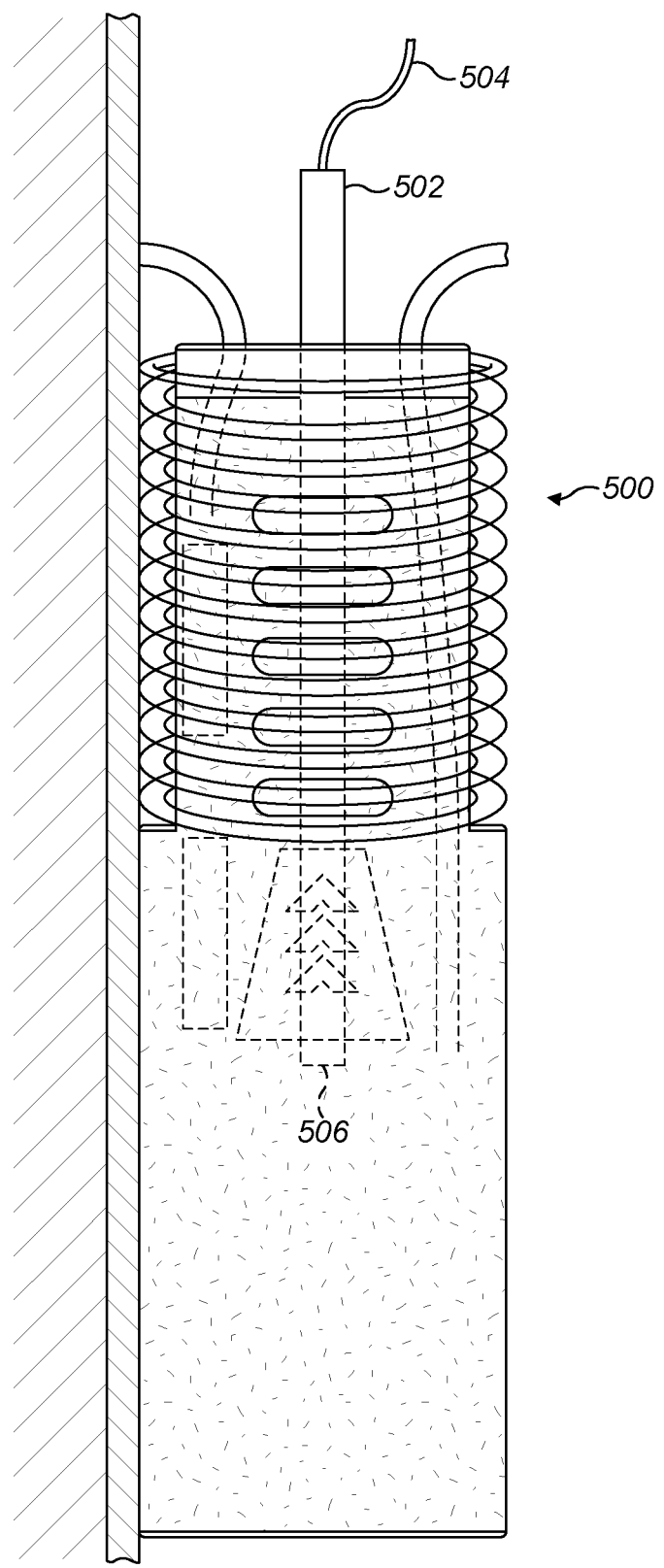
FIG. 5 shows a working electrode electrochemical cell device.
Figure 6:
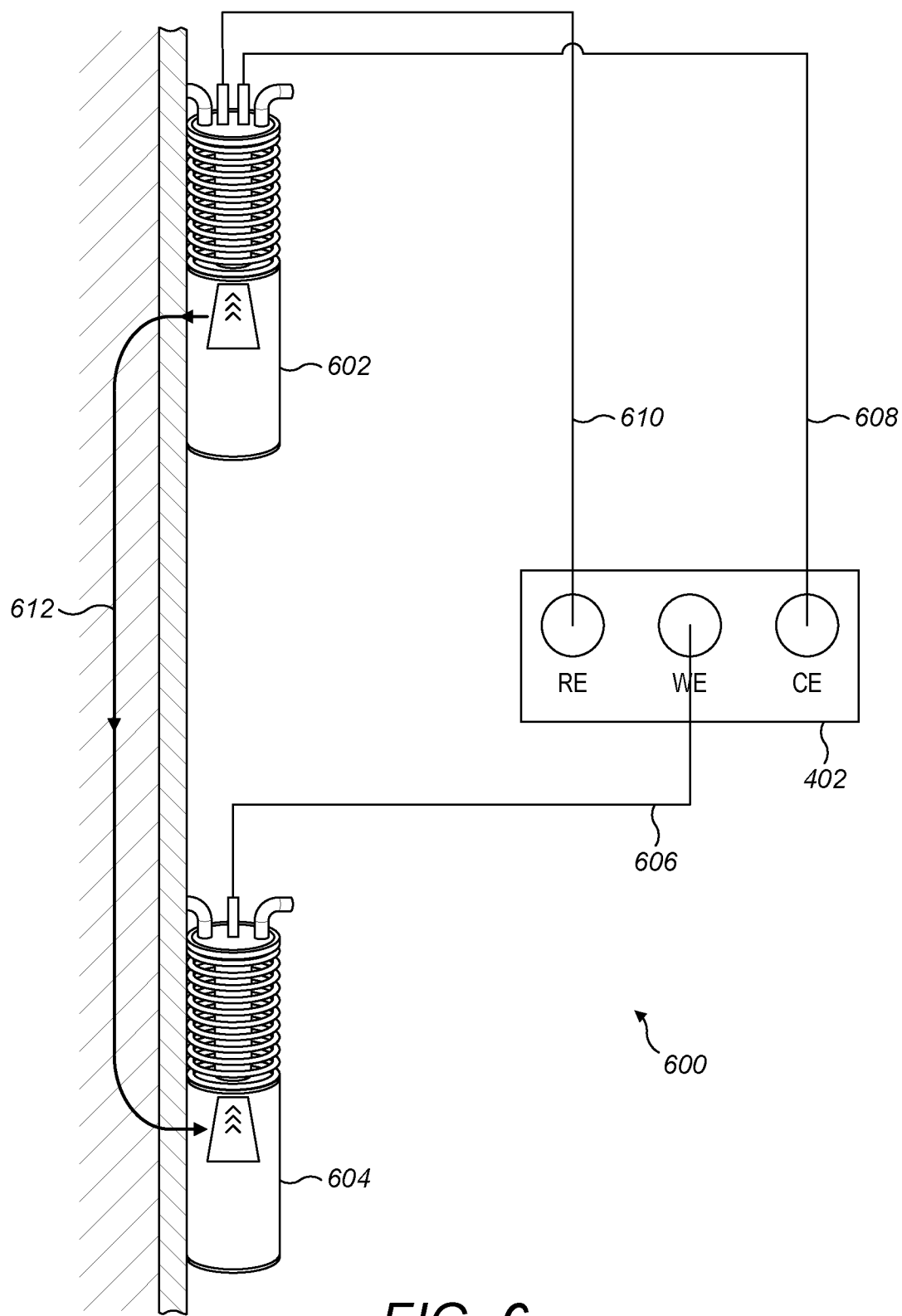
FIG. 6 shows a system for sensing electrochemical change in an object, the system in the form of a two-electrochemical cell device setup.

The counter electrode cell device in this example is the two-electrochemical cell device shown in FIG. 2. The working electrode cell device 500 is as shown in FIG. 5. Magnets 218, 220 within the two cell devices enable them to be attached to the coating 250 as shown in FIG. 6.

The working electrode cell device contains a working electrode connected to a WE cell cable 504 (FIG. 5) and further contains a metal mesh 506 inside the chamber. When both electrochemical cell devices 602, 604 are placed on the coating 250 an electrochemical cell setup is formed between the bodies 602 and 604 of both the cell devices. By connecting the potentiostat cell cable working electrode lead 606 to the electrode of the working electrode cell device 500, and the potentiostat counter electrode cable lead 608 and reference electrode cable lead 610 to the counter 208 and reference 210 electrodes of the counter electrode cell device 200, a 3-electrode configuration is formed as shown in FIG. 6. Using two electrochemical cell devices results in a current path 612 that flows from the counter electrode 208, through the counter electrode cell device 200 electrolyte 206, through the counter electrode cell device 200 body 602, through the coating 250 to the substrate 226 and then through the working electrode cell device 500 body 604, through the working electrode cell device 500 electrolyte 206 to the working electrode 502.

The two cell device setup can be used to conduct EIS for measuring the condition of coating 250 to which the two cell devices 500, 200 have been attached. In the case of a coated metal in contact with the electrolyte 206 through the electrochemical cell device, the coating capacitance is:

$$C_c = \frac{\varepsilon_o \varepsilon_r\, A}{d}$$

Where $\varepsilon_o$ is the permittivity of vacuum (approximately $8.854 \cdot 10^{-12}$ F·m$^{-1}$), $\varepsilon_r$ is the relative electrical permittivity (dielectric constant) of the coating, A is the surface area of the coating in m$^2$ and d is the thickness of the coating in m.

Thick, high-quality coatings characteristically have very low capacitance $C_c$ due to their very low relative dielectric constant (4 to 8). By contrast, degraded coatings have high capacitance $C_c$ due to their relatively high dielectric constant (50-80). Water has a dielectric constant of 80. If the degraded coating absorbs water, therefore, its dielectric constant can be in the range of 50-80.

The two electrochemical cell devices 200, 500 can be used to measure the condition of the coating beneath them. The detection area of the coating 250 beneath the cell devices acts as a capacitor and provides a path way for the flow of current between the clamped cell devices and the substrate 226. The detection area can be increased by extending the length of both or one of the cell devices 200, 500 as described above with reference to FIGS. 2 and 3. With the extension, more coating 250 area comes in contact with the cell devices.

The impedance of the coated substrate 226 is measured by applying a small sinusoidal signal between the counter electrode 208 and the working electrode 502 with a frequency in the range of 0.001-1000000 Hz. The impedance is given as:

$$Z_{CPE} = \frac{1}{j\omega\alpha C_c}$$

Where, $\omega$ is called the 'Frequency' and $\alpha$ is the exponent, equalling 1 for a capacitor. A measurement batch typically consists of a number of frequency sweeps, while the response of the system is monitored.

Investigations using the electrochemical cell device 200 can be performed through either the potentiostatic or the galvanostatic mode. In the potentiostatic mode, a potentiostat/galvanostat controls the potential of the counter electrode against the working electrode so that the potential difference between the working electrode and the reference electrode is well defined, and corresponds to a value specified by the user. In galvanostatic mode, the current flow between the working and the counter electrode is controlled. The potential difference between the reference and working electrode and the current flowing between the counter and working electrode are continuously monitored. In most cases, the potentiostatic mode is preferred. For most products, under investigation, the open circuit potential is stable. Maintaining the same potential during the measurement therefore does not deviate strongly from the operating situation of the substrate. For these substrates the potentiostatic mode therefore yields the best results.

The impedance response of a system during a potential scan is generally linear. The response depends on the range of potentials. Extremely small values can produce poor signal to noise ratio and hence noisy data. Extremely large values can cause non-linearity of the impedance response. The normal range is between 1-30 mV, for most electrochemical systems. In this example, 20 mV is used.

The user can validate the linear response by performing same experiment at different potential ranges.

The measurement time is a function of frequency range. Extremely small frequencies result in larger measurement time. For systems which change over the period of time—for example corrosion film formation—keeping a smaller frequency range ensures minimal change in the system during data collection. An electrochemical impedance measurement can for instance be started at a frequency of about 1 kHz and can continue till 1 MHz which can take up to 2 minutes. For the case of degraded coatings, which do not require high frequencies, the measurement can start from 0.001 Hz or even below. For good-quality measurements, each experiment can be conducted over a large frequency range, for example from 0.001 Hz to 1 MHz.

The data for measured impedances can be fitted with an equivalent circuit. Each component of the circuit represents a physical behaviour in the system. For example, a resistor represents the resistance offered by the electrolyte 206 while a capacitor represents the capacitance of a coating 250. With the degradation of a coating 250, the equivalent circuit expands due to initiation of new processes. The fitting of an equivalent circuit helps to understand the physical processes in the degradation of the coating 250.

The feature of the electrochemical cell device 200 that it can be extended makes it possible to perform detection on a large surface area of coating 250 (up to 16800 mm$^2$ in the present example). Conventional electrochemical cell devices, by contrast, are in general able to perform detection over only few square mm (up to around 5000 mm$^2$ for some devices). Accordingly, the apparatus and system of the present disclosure can be used for analysing large structures such as automotive, bridges, pipelines, ship hulls, pressure tanks, ballast tanks and flood gates.

Thus, the above description discloses apparatuses and systems for use in sensing electrochemical change in an object, as well as ways in which to put these apparatuses and systems into effect.

The invention claimed is:

1. An apparatus for use in sensing electrochemical change in an object, the apparatus comprising:
   a substantially electrically conductive body defining a cavity for containing an electrolyte, the body having a first surface arranged to be, in use, in electrically conductive contact with the object along substantially the whole of a length of the first surface and arranged physically to isolate, in use, the electrolyte from the object; and
   at least a first electrode at least partially within the cavity, the first electrode for connection to a potentiostat or a galvanostat and arranged to be, in use, in electrical contact with the electrolyte in the cavity;
   wherein the electrically conductive body comprises at least a first part and a second part, the second part slideably movable relative to the first part from a first, retracted, position to a second, extended, position, such that the length of the first surface is greater when the second part is in the second position than when the second part is in the first position.

2. The apparatus of claim 1, wherein the first and second parts are substantially tubular and are arranged such that at least a first portion of one of the parts is radially within the other part when the second part is in the first position.

3. The apparatus of claim 1, wherein the body is arranged to retain electrolyte at substantially any orientation of the body.

4. The apparatus of claim 2, wherein each of the first and second parts comprises an end that is distal from the other part and that is substantially closed.

5. The apparatus of claim 1, wherein the apparatus further comprises an electrolyte contained by the cavity; a potentiostat or a galvanostat electrically connected to the first electrode; and an electrical connector arranged to be electrically connected to the object.

6. The apparatus of claim 1, wherein the body comprises at least one magnet arranged to, in use, apply a magnetic force to the object and thereby to attach the body to the object.

7. The apparatus of claim 5, wherein the substantially electrically conductive body is a permanent magnet.

8. The apparatus of claim 1, wherein the apparatus further comprises a substantially electrically conductive overlay on at least a portion of the first surface, the substantially electrically conductive overlay arranged to conduct, in use, electricity between the first surface and the object.

9. The apparatus of claim 8, wherein the overlay is arranged on a second portion of the second part that is not radially within the first part when the second part is in the first position.

10. The apparatus of claim 8, wherein the overlay is arranged to be in a first state when the second part is in the first position and in a second state when the second part is in the second position, wherein the second state is extended relative to the first state.

11. The apparatus of claim 10, wherein the overlay is a mesh, folded material or coil that is arranged to be extended or compressed or both.

12. An apparatus according to claim 1, wherein substantially all of the body is substantially electrically conductive.

13. An apparatus according to claim 1, wherein the body comprises first and second pipes in fluid communication with the cavity, the first pipe arranged to be used to introduce electrolyte into the cavity, the second pipe arranged to allow air to escape from the cavity.

14. The apparatus according to claim 13, wherein the first pipe extends further into the cavity than the second pipe.

15. A system for use in sensing electrochemical change in an object, the system comprising:
   (i) a first apparatus for use in sensing electrochemical change in an object, the first apparatus comprising:
   a substantially electrically conductive body defining a cavity for containing an electrolyte, the body having a first surface arranged to be, in use, in electrically conductive contact with the object along substantially the whole of a length of the first surface and arranged physically to isolate, in use, the electrolyte from the object; and
   at least a counter electrode at least partially within the cavity, the counter electrode for connection to a potentiostat or a galvanostat and arranged to be, in use, in electrical contact with the electrolyte in the cavity;
   wherein the electrically conductive body comprises at least a first part and a second part, the second part slideably movable relative to the first part from a first, retracted, position to a second, extended, position, such that the length of the first surface is greater when the second part is in the second position than when the second part is in the first position; and
   (ii) a second apparatus for use in sensing electrochemical change in an object, the second apparatus comprising:
   a substantially electrically conductive body defining a cavity for containing an electrolyte, the body having a first surface arranged to be, in use, in electrically conductive contact with the object along substantially the whole of a length of the first surface and arranged physically to isolate, in use, the electrolyte from the object; and at least a working electrode at least partially within the cavity, the working electrode for connection to a potentiostat or a galvanostat and arranged to be, in use, in electrical contact with the electrolyte in the cavity;

wherein the electrically conductive body comprises at least a first part and a second part, the second part slideably movable relative to the first part from a first, retracted, position to a second, extended, position, such that the length of the first surface is greater when the second part is in the second position than when the second part is in the first position.

\* \* \* \* \*